United States Patent [19]
Rubino et al.

[11] Patent Number: 5,638,249
[45] Date of Patent: Jun. 10, 1997

[54] ELECTROSTATIC SUPPORT SYSTEM

[76] Inventors: Peter M. Rubino, 2927 Moraga St., San Francisco, Calif. 94122; Robert M. Rubino, 22 Saturn St., San Francisco, Calif. 94114

[21] Appl. No.: 283,571

[22] Filed: Aug. 1, 1994

Related U.S. Application Data

[63] Continuation-in-part of Ser. No. 926,123, Aug. 4, 1992, abandoned.

[51] Int. Cl.$^6$ ............................................. H02N 13/00
[52] U.S. Cl. ........................ 361/225; 361/233; 361/234
[58] Field of Search ............................. 361/225, 229, 361/230, 233, 234, 232; 250/324–326; 40/124.1, 594; 264/423, 438, 446, 483; 425/174.8 R, 8 E

[56] References Cited

U.S. PATENT DOCUMENTS

| | | | |
|---|---|---|---|
| 352,084 | 11/1886 | Drescher | 361/232 X |
| 2,253,315 | 8/1941 | Andrus | 231/2 |
| 3,440,750 | 4/1969 | Toth et al. | 40/140 |
| 3,793,112 | 2/1974 | Sontag et al. | 156/306 |
| 4,225,369 | 9/1980 | Felchin | 156/71 |
| 4,275,112 | 6/1981 | Savage, Jr. | 428/310 |
| 4,372,798 | 2/1983 | Dalton | 361/225 X |
| 4,608,109 | 8/1986 | Pook | 156/247 |
| 4,652,239 | 3/1987 | Brimberg | 434/80 |
| 4,741,119 | 5/1988 | Baryla | 40/594 |
| 4,987,332 | 1/1991 | Yamamoto et al. | 310/309 |
| 4,992,121 | 2/1991 | Rubino | 156/71 |
| 5,010,671 | 4/1991 | Stonehouse | 40/594 |
| 5,443,703 | 8/1995 | Blitshteyn | 204/165 |
| 5,486,974 | 1/1996 | Kasahara | 361/234 |

FOREIGN PATENT DOCUMENTS

| | | |
|---|---|---|
| 57-21472 | 2/1982 | Japan . |
| 2231551 | 11/1990 | United Kingdom . |

OTHER PUBLICATIONS

McGraw–Hill Encyclopedia of Science & Technology, 6th Edition, "Electret" pp. 1–2 and Electrostatics pp. 250–252.
Patent Abstract for JP 59–111183 "Adhesive Electrostatic Sheet of Flueropolymer e.g. PFTE" Dec. 1982.

*Primary Examiner*—Fritz Fleming
*Attorney, Agent, or Firm*—Limbach & Limbach, L.L.P.

[57] ABSTRACT

An electrostatic support system for applying posters and the like in a removable fashion on wall surfaces using a thin film or foam layer of dielectric backing and a hand-held high voltage charger suitable for creating corona charged particles. The system and method provide a practical, simple and inexpensive manner of mounting displays which may be easily removed and repositioned without damage to the wall surface.

23 Claims, 3 Drawing Sheets

ELECTROSTATIC SUPPORT SYSTEM

This application is a continuation-in-part of application Ser. No. 07/926,123, filed Aug. 4, 1992, now abandoned.

FIELD OF THE INVENTION

This invention relates to a layered composite structure for providing strong adhesion of displays, such as posters, to wall spaces using static electricity, and to methods for obtaining such adhesion. It further relates to a hand held, potable, electrostatic charging apparatus.

BACKGROUND OF INVENTION

Static cling vinyl decorations are commonly sold as novelties that support themselves electrostatically on a window. Other polymer films may do the same on a wall. Polymeric sheets which make up such displays are readily available for use in advertising, as wall mountable easel sheets and the like. They may support themselves on a wall or window but they are incapable of supporting additional materials.

Other materials, such as certain polymeric foams and sheets are known as a way to electrostatically mount display materials. For example, U.S. Pat. No. 4,225,369 to Felchlin discloses methods of securing a poster behind a plastic sheet, the combination then being secured to a wall. Felchlin teaches that the base must be secured by wetting and then only on a smooth surface such as glass, varnished wood, and so on, but that if the base has a rough texture only temporary adhesion can occur. Also stressed is that adhesion is produced not only by static but by closely contacting of the sheet with the base. This is an adaptation of the so-called static cling method, a surface tension-atmospheric pressure method.

U.S. Pat. No. 4,741,119 describes a display board but does not indicate a method or article that will hold a poster to any kind of wall surface. The dielectric plastic sheet, if light enough, just as with a supermarket plastic bag, may be capable of supporting itself to a wall for limited periods of time but it will not adhere a poster to a wall. This patent discloses that a document clings electrostatically on the surface of a dielectric plastic backing board. The document is in turn covered by a sheet of thin plastic that "tends to cling electrostatically." When charged by manual friction, some of these films are capable of supporting themselves electrostatically to a poster and vice-versa, but none of the methods cited in this patent will hold a poster satisfactorily to a surface such as a wall.

U.S. Pat. No. 4,275,112 discloses the use of an electrostatically chargeable intermediate sheet of double charged irradiation cross-linked insulative plastic foam with a bulk-density of 2 lbs. per cubic ft. and a nominal thickness of ¼ inch. This document teaches that the surface of the sheet should be precharged by rubbing with a wool pad, stored for several days in an envelope and recharged again before installation. We have found that the structure and method disclosed by this patent results in adhesion which lasts for a limited amount of time, and which results in adhesion for shorter and shorter periods of time each time the intermediate sheet is charged as described.

U.S. Pat. No. 4,992,121, to one of the inventors of this application, relates to the discovery that commercial electrostatic buffing materials often contain contaminants or additives that are detrimental to creating maximum polarization densities in dielectric foam materials, and that the use of such substantially oil and fat free materials greatly enhances the degree and time of adhesion for wall mounted displays.

Certain organic polymers used for polarization of electrets in research and commercial applications, in the form of films 5-50 micrometers thick, are known to hold electrostatic charges. Polarization densities may be increased even more when materials such as polyvinylidene-fluoride (PFDF) films are stretched three to five times and subjected to corona charging at room temperatures. However, such materials have not found use in commercial electrostatic mounting systems because of the practical difficulty of applying a sufficient charge, e.g. a corona charge, at the time the display is to be mounted on a wall.

SUMMARY OF THE INVENTION

In order to overcome the aforementioned problems and to obtain significant increases in holding time and the strength with which displays may be electrostatically adhered to walls (including metal, wooden and plaster), windows and the like (e.g., exceeding a year), which displays are easily removed and replaced or repositioned as desired, the present invention comprises a method for electrostatically adhering an object to a wall surface comprising the steps of positioning the object, which must have at least one substantially flat surface, adjacent an electrostatically chargeable dielectric material, and exposing the object to a high voltage electron discharge using an electrically powered portable, hand-held unit, to impart a static electrical charge in the material sufficient to adhere the object to a vertical wall surface.

In a preferred embodiment, the object to be adhered to the wall is a paper display, such as a poster, having a thickness of less then $\frac{1}{100}$th of an inch, and the chargeable material is a film of polyethylene or polypropylene ranging in thickness from 0.5 mil to 3 mil. Films of polytetrafluorethylene, fluoroethylenepropylene and polyethyleneterephthalatemay also be used.

The dielectric material can also be a foam made up of organic polymeric material selected from the group consisting of polyethylene, polypropylene, polyester, polycarbonate and polyimide.

The invention further comprises an apparatus for producing an electric charge which can be used to charge the materials discussed above, comprising a high voltage multiplier, means for connecting the high voltage multiplier to an electrical power source (such as household current or batteries), an electrically insulated housing shaped to be gripped and held in the human hand, and positioned within said housing, an electrode means for creating a high voltage discharge, the electrode means being electrically connected to the voltage multiplier.

BRIEF DESCRIPTION OF THE DRAWINGS

The present invention will be better understood by reference to the attached drawing figures, wherein.

DETAILED DESCRIPTION OF THE INVENTION

The present invention comprises a method for electrostatically adhering an object, such as a paper poster, to a vertical wall surface. To achieve this end in a practical way, we have invented a portable, hand-held high voltage charger. The charger creates initial polarization densities which make it possible to charge many kinds of dielectric films or foams to a degree that makes them capable of supporting display materials on vertical walls. As reported below in our experiments using this charger, electrically charged composites have supported display weights of more than four pounds per sq. ft. before slipping down a vertical wall. Light weight display materials will remain up for months, and possibly years. The dielectric film may be positioned under and charged through the paper onto the wall, or the two components may be charged separately—first the film to the wall, then the display placed over it and the composite charged a second time.

The high voltage charger is a solid state high voltage multiplier with specifications and performance description as follows. By "high voltage," we mean voltage sufficient to create a high density electron discharge sufficient to charge the dielectric materials disclosed herein. For example, a voltage of 15 kV is capable of producing a charge density of $1 \times 10^{-7}$ coulomb/cm$^2$.

Figure 2:
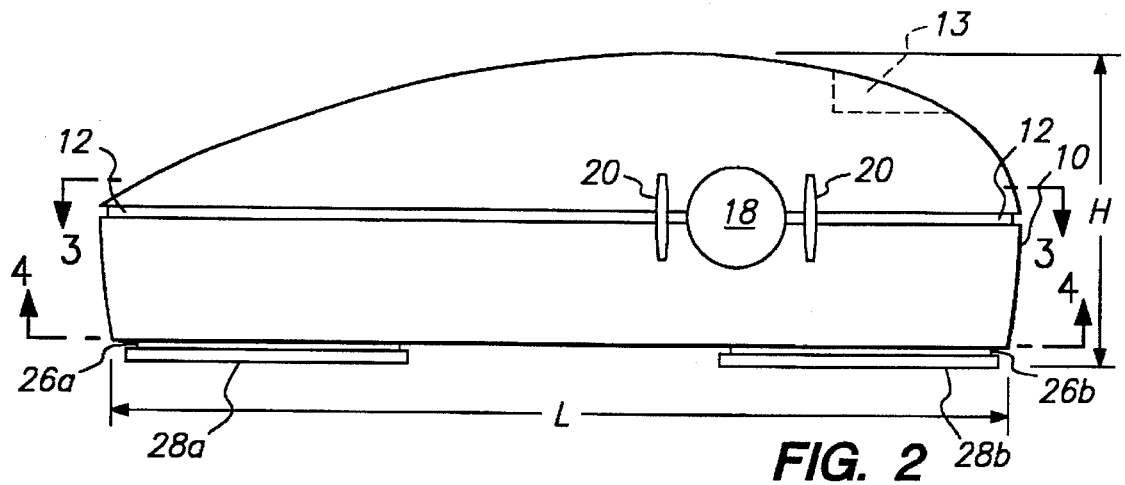
FIG. 2 is a side plan view of the hand-held apparatus.
Figure 3:
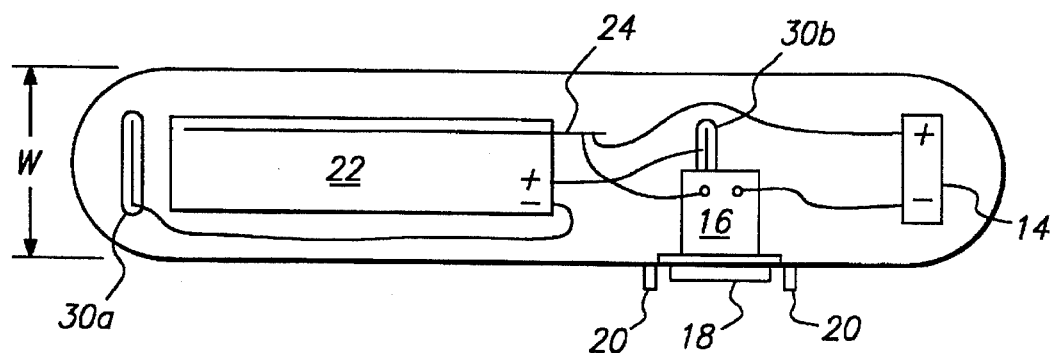
FIG. 3 is a top plan sectional view taken across the section 3—3 of FIG. 2.
Figure 4:
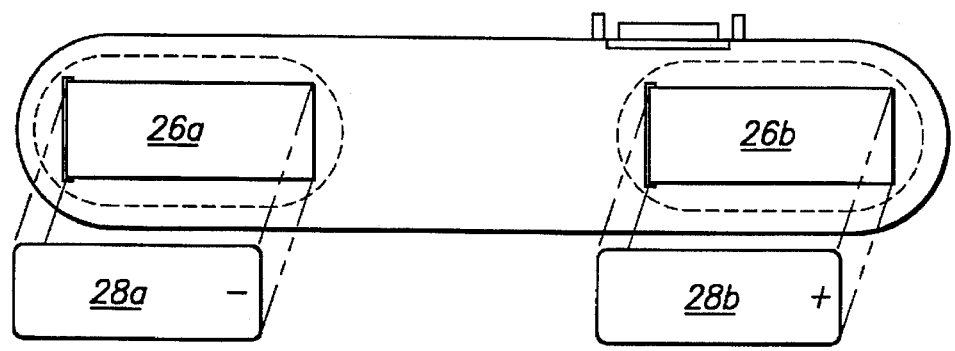
FIG. 4, is a bottom plan sectional view taken across the section 4—4 of FIG. 2.

Referring now to FIGS. 2-4, the preferred embodiment of the present invention, currently marketed as the AIR MOUNT™ static electricity mounting system by The Adhesive Alternative Company in San Francisco, Calif., is illustrated. A durable plastic housing 10 measures approximately 6.75 inches in length L by 2.5 inches in height H by 1.5 inches in width W, which is a comfortable size for an adult to hold and use the apparatus. The housing is manufactured in two halves and prefably glued or otherwise connected together by suitable means at seam 12. The user may open a battery compartment 13 in the top of the housing 10 and replace the two 9 volt batteries (not shown) which are required in the preferred embodiment. The batteries are attached to the battery posts 14, which are mounted on an insulated fiber mounting plate, the plate being loosely held within the housing by soldered wire connections to the posts, as is conventional and well known.

A switch 16 including push-button 18 is mounted within an opening in the housing. An Oslo Controls model SPM1C switch rated for 10 amp at 250 VAC may be used. Protective posts 20 may be molded with the housing to help protect the switch and to quickly identify its location by feel.

A high voltage multiplier 22 is mounted within the housing 10 as part of an integral printed circuit board assembly 24 and is used to develop a high voltage at extremely low amperage. Preferably, a solid state voltage multiplier is used, such as the AIR MOUNT™ model CS2112A6 as made by Collmer Semiconductor, which increases standard 120 VAC or 4.8 VDC to several thousand volts while keeping the amperage at very low, safe levels. Tests ranged from 1000 to 18,000 volts and from 1 to 150 microamperes. Preferably, the high voltage multiplier is configured to deliver less than 5 µA of current at 18 kV in a 25 kHz pulse train.

The switch 16 is wired in series on the negative polarity leg between the battery 14 and the power input terminal on HVM board 24. The positive lead of battery 14 is wired directly to the power input terminal of HVM board 24.

A pair of thin copper electrodes 26a and 26b, such as 3M No. 1194 adhesive-backed copper tape, measuring approximately 1.5 inches in width by 2.25 inches in length are mounted on the outer surface of the housing 10 and are connected to the power output terminals of the HVM 22 through openings 30a and 30b in the housing. Carbon and various metals of different shape and size, such as razor blades, rods, sewing needles, brushes, threaded screws, ball bearings, wire, etc., have also been successfully tested for use as the electrode component. Trillions of electrons are generated each second by the high voltage multiplier and conducted to the electrodes. As the electrodes are passed over the display face, these charges are deposited onto and through the composite.

A pair of electrically conductive felt pads 28a and 28b, such as BDH Industries No. SF-10-40-020-3455, measuring approximately 0.125 inches thick are affixed covering the electrodes 26a and 26b, respectively. The conductive felt is effective for conducting electrons to the display or film surface without scratching the surface, as well as reducing any shock hazard to a mere tingle if both pads are touched when the hand-held unit is turned on. The conductive felt is made from polyester, carbon and steel fibers.

Two other types of chargers were designed and successfully tested: a hand-held rechargeable battery operated unit with DC voltage ranging from 4.8 to 12 V and another unit that is cord-connected to a standard 120 VAC wall outlet.

Figure 1:
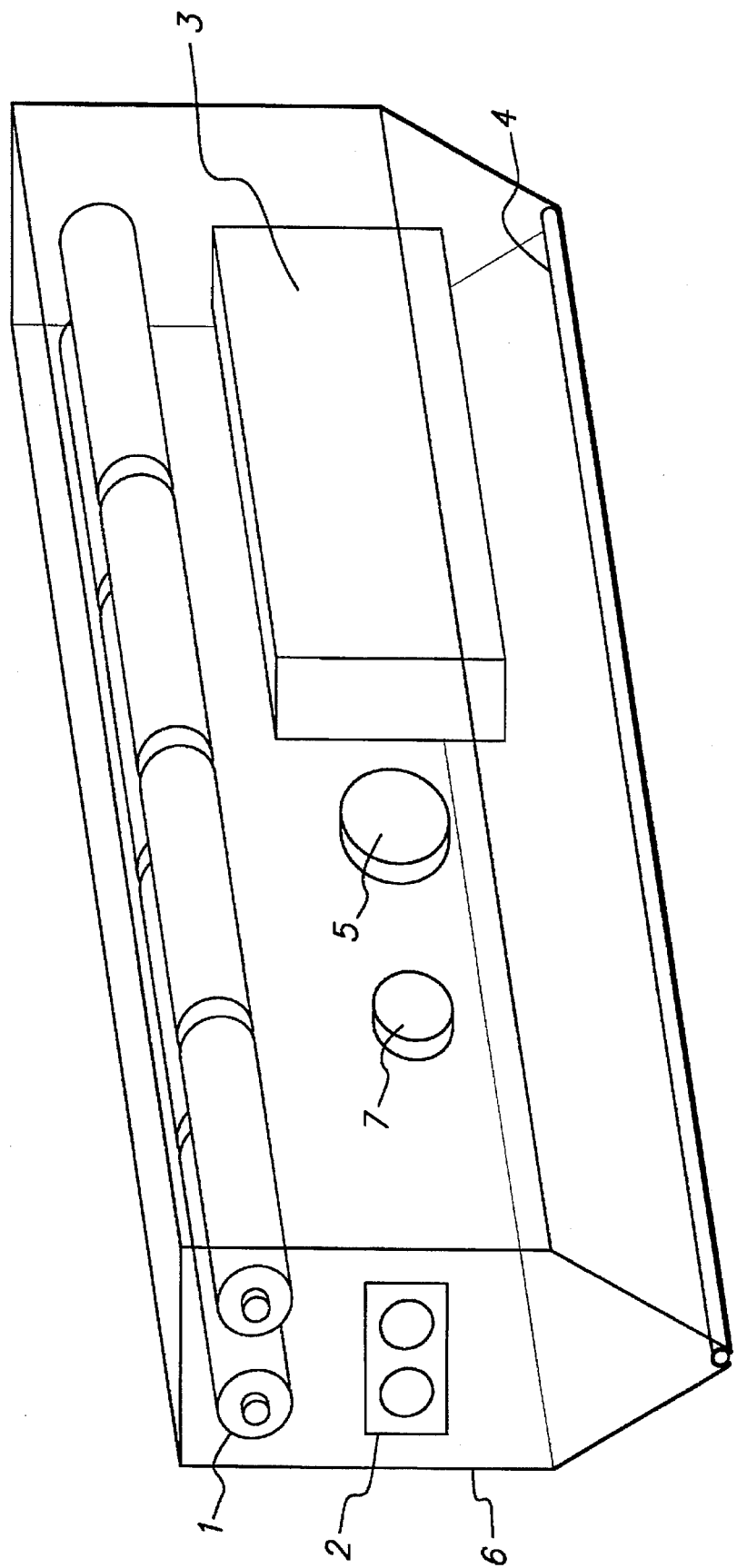
FIG. 1 is a perspective view showing one embodiment of an electric charger, and the internal components of the same, suitable for imparting a strong electrostatic charge to a layered composite.

Another embodiment of the hand-held charger is shown in FIG. 1. The hand-held charger includes a durable plastic housing 6 which is insulated from the electrical components inside. The housing is shaped to be held in the user's hand so that it may easily be held against a wall surface.

On the exterior surface of the housing is an off/on switch 5, a positive/negative switch 7 which determines the nature of the charges, and a battery recharge jack 2. Inside the housing are the essential components for the high-voltage charger, namely power source (batteries) 1, high-voltage multiplier 3 and electrode 4. Though not shown in FIG. 1, the high voltage multiplier is connected to the power source and to the electrode so that a high voltage charge is applied thereto.

In practice, the entire unit of FIG. 1 is about the size of a small resistance-type hand-held hairdryer.

Many variations in the charger are possible, for example, a fan may be included in the charger housing to draw air into the shell via an intake port (not shown). The air or particles in the air are electronically charged as they pass over the HVM and the electrode to which said HVM is connected. The charged air exits a narrow, slotted, inverse funnel-shaped exhaust port and is deposited onto the dielectric material to be charged. We have found that the fan is not necessary, but may be useful in the invention.

The electrode may take other shapes as mentioned previously. Also, the power supply can be via a standard power cord from a 120 volt AC outlet.

The position of the electrode need not be immediately adjacent the vented opening of the housing as long as the hand charger can be held sufficiently close to the object to be charged to impart the necessary electrostatic charge.

Further, while less practical in use, the hand-held unit could include only the single electrode, and the power source and HVM could be in a separate unit which would be cord-connected to supply the high voltage power to the electrode. Those skilled in the art will identify many ways to arrange the components of the hand charger, the key being to have a hand-held source of high voltage discharge which can be moved over a display surface on a wall.

We have also found that certain materials and combinations of materials (i.e. relatively thin films and foams) can be used very effectively as backing as electrostatic adhesive for mounting objects to wall surfaces when a strong electrostatic charge is applied using the portable, hand-held charger of the invention. By "objects," it is meant paper (such as posters and the like), but also any object which has at least one substantially flat surface. While certain polymeric films and foams are known to hold electrostatic charges, there has been no simple and effective means for imparting a charge to them at the time they are to be mounted, where the charge is of adequate strength to hold objects on vertical walls for periods well over a year, even if the object is occasionally repositioned on the wall.

The portable, hand-held, high voltage charger is adequate to impart the necessary charge to the chargeable materials of the invention at the time they are to be wall mounted. The availability of the portable charger creates a way to quickly and conveniently mount any electrostatically chargeable material or combination of materials on any wall surface for extended periods of time. The system is therefore extremely useful for trade shows, seasonal advertising displays and home or office use.

In our experiments, as described below, we applied various films and foams to paper posters to determine which combinations were feasible for long term adhesion. It should be kept in mind, however, that any object having at least one substantially flat surface can be used with the invention, since this allows the flat surface to be combined with the chargeable materials of the invention. Such combinations are limited only by the holding strength of the electrostatic charge imparted to the materials. As shown below, we have found that the most preferred combinations of the invention, once charged, require a force of over 2000 grams per square foot (approx. 70 ounces) to "break" the adhesive force and pull them down a vertical wall.

Figure 5:
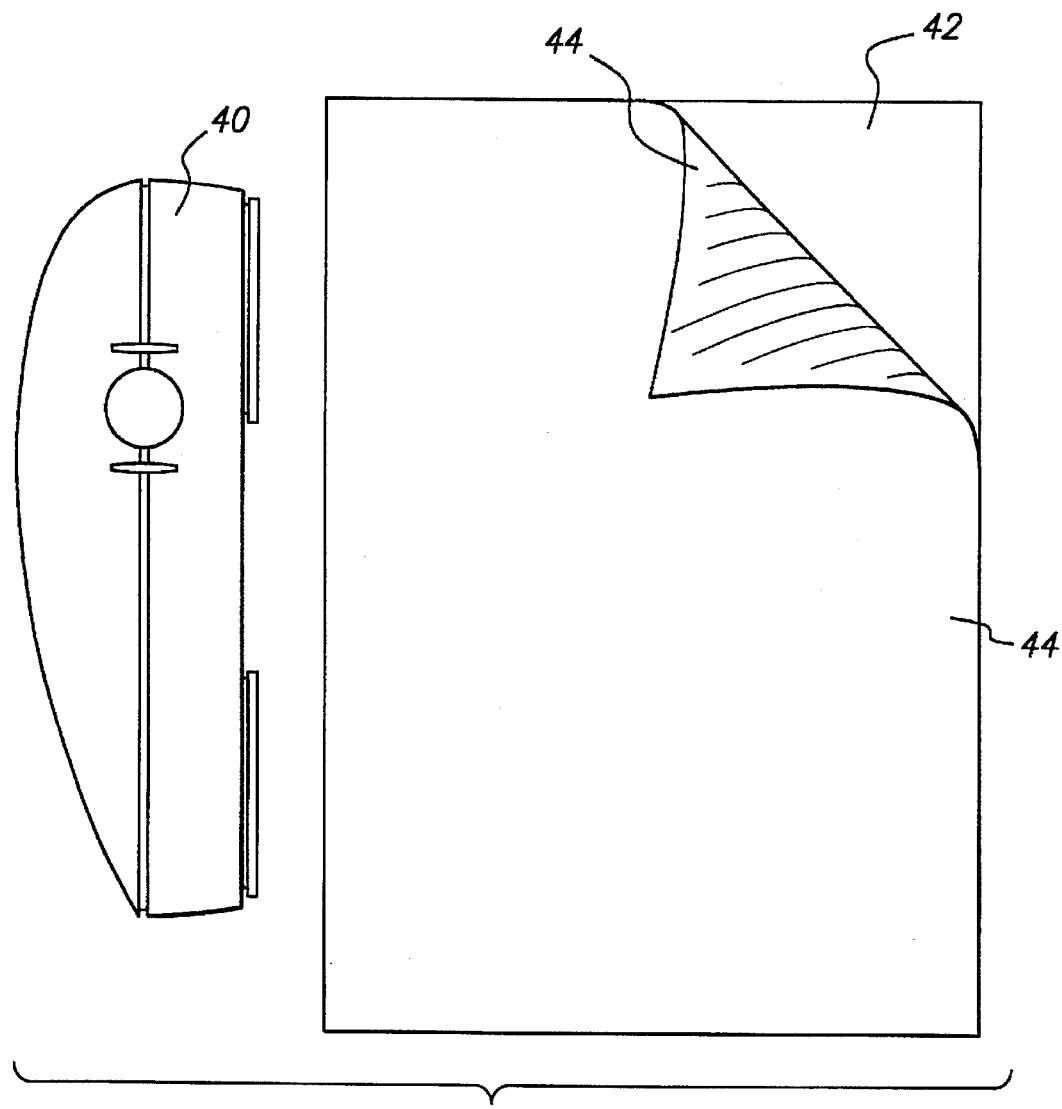
FIG. 5 is a perspective view of a hand-held charging apparatus and a paper poster that is backed with a sheet of electrically-chargeable, dielectric material.

FIG. 5 illustrates a hand-held charging apparatus 40 and a paper poster 42 that is backed with a film of electrically-chargeable, dielectric material 44. The film 44 is partially folded back at the upper right hand corner for purposes of illustration. The dielectric material may be an electrically-chargeable polymer film, or may be a composite sheet as described above in Table 2, such as a composite polymer film-paper-polymer film sheet.

In our experiments, we compared not only different materials, but also compared "hand charging" (e.g. using lambswool or the like) to electrical (corona) charging using the hand charger of the invention. As will be seen, electrical charging provided highly improved results in each instance. With hand charging, even though the materials could sometimes initially be adequately charged, the degree of charging is unsatisfactory for long term high strength adhesion.

EXPERIMENTAL RESULTS

In the following "electric charge" embodiments the display composite is placed against a wall and charged by lightly passing the electric charger of the invention over the face of the display i.e. grazing the surface of the display. This may be accomplished by making a few passes over the display or by merely charging one corner of the display long enough to allow the charge to spread over the entire surface of the display. For heavier, thicker displays it may be desirable to charge the film side prior to placing the display on the wall. The display side is then also charged.

In the following combinations the film or foam is heat bonded or adhesive bonded to the paper. The results reported ("excellent", "very good", etc.) are a composite of results achieved with all foam, film and paper types and thicknesses which could be charged. The limits of these features, i.e. thickness and type, are identified in Table I below.

TABLE I

|  | Hand Charge | Electric Charge |
| --- | --- | --- |
| 1) Wall - Foam - Paper | Very Good | Excellent |
| 2) Wall - Foam - Film - Paper | Very Good | Excellent |
| 3) Wall - Film - Foam - Paper | Poor | Excellent |
| 4) Wall - Foam - Film - Foam - Paper | Good | Very Good |
| 5) Wall - Film - Paper | Poor | Excellent |
| 6) Wall - Paper - Film - Paper | Poor | Poor |
| 7) Wall - Film - Paper - Film | Poor | Excellent |
| 8) Wall - Foam - Paper - Film | Very Good | Excellent |

Using no heat or adhesive bonding between the paper and film or foam layer the following results were achieved:

TABLE II

|  | Hand Charge | Electric Charge |
| --- | --- | --- |
| 1) Wall - Foam - Paper | Good | Excellent |
| 2) Wall - Foam - Film - Paper | Good | Excellent |
| 3) Wall - Film - Foam - Paper | Poor | Excellent |
| 4) Wall - Foam - Film - Foam - Paper | Good | Very Good |
| 5) Wall - Film - Paper | Poor | Excellent |
| 6) Wall - Paper - Film - Paper | Poor | Poor |
| 7) Wall - Film - Paper - Film | Poor | Excellent |
| 8) Wall - Foam - Paper - Film | Good | Excellent |

The following foam and film materials were used in our tests, and charge retention characteristics qualitatively judged:

TABLE III

| 1) Polyethylene Foam, Non-Crosslinked | Excellent |
| --- | --- |
| 2) Polyethylene Foam, Crosslinked | Poor |
| 3) Polyurethane, Crosslinked | Poor |
| 4) Natural Rubber Foam | Poor |
| 5) Polyethylene Film | Excellent |
| 6) Polyester Film | Excellent |
| 7) Acetate Film | Poor |
| 8) "Cling Wrap" - type Polyethylene Film | Poor |
| 9) Vinyl Film | Poor |
| 10) Teflon Film | Excellent |
| 11) Polypropylene Film | Excellent |

For various foam densities and thicknesses, the following results, reflecting the relative degree of electrostatic holding power, were measured:

TABLE IV

| Foam Thickness | Bulk Density Per Cubic Foot | |
| --- | --- | --- |
| 1/100" | 6 pounds | Very Good |
| 1/64" | 2 pounds | Good |
| 1/50" | 6 pounds | Excellent |
| 1/32" | 2 pounds | Good |
| 1/16" | 2 pounds | Poor |
| 1/8" | 2 pounds | Poor |

For films, the effect of thickness on electrostatic holding power was measured, the results being a composite of all films which took a satisfactory charge:

TABLE V

| Film Thickness | |
| --- | --- |
| 1/2000" (.5 mil) | Excellent |
| 1/1000" (1 mil) | Excellent |
| 1/500" (2 mil) | Very Good |
| 1/333" (3 mil) | Good |
| 1/250" (4 mil) | Poor |

For paper displays used with the invention, thickness and density effects were measured as follows:

TABLE VI

| Paper Thickness and Density: | |
| --- | --- |
| 1/250" (4 mil) Medium Density | Excellent |
| 1/250" (4 mil) Heavy Density | Very Good |
| 1/165" (6 mil) Medium Density | Very Good |
| 1/165" (6 mil) Heavy Density | Very Good |
| 1/125" (8 mil) Medium Density | Good |
| 1/125" (8 mil) Heavy Density | Good |
| 1/100" (10 mil) Medium Density | Good |
| 1/100" (10 mil) Heavy Density | Good |
| Over 10 mil | Poor |

These results show that the best combination for hand charging was Wall - Foam - Film - Paper, where Foam is 1/50" 6 pound per cubic foot bulk density polyethylene; Film is 1/2000" PE film laminated by heat or glue on one side of the foam; and paper is 1/250" medium density paper that is heat or glue bonded to the film side of the foam, had a wall holding power of about 520 grams per square foot of charged surface.

For electric charging (i.e. corona charging) the most preferred combination was Wall - Film - Paper, where Film is 1/1000" to 1/2000" polyethylene or polypropylene; Paper is 1/250" medium density paper, and Paper may or may not be bonded by glue or the like to film.

In this embodiment, holding power of almost four times that achieved with the best combination for hand charging, about 2000 grams per square foot of charged surface, was measured. The significance and unexpected nature of the holding power achieved using the high voltage hand charger is further highlighted by comparing the results of the Wall-Film-Paper embodiment using hand charging ("poor") versus the excellent holding power obtained using the hand charger (2000 grams/square foot). In another embodiment an outer film or varnish layer can be laid over the display (Wall - Film - Paper - Film or Plastic/Varnish). In this embodiment the display can be protected by using a transparent outer layer. The measured holding power of this embodiment was about the same as the Wall - Film - Paper embodiment, about 2000 grams per square foot.

A number of practical combinations become available with the knowledge that the charger of the invention allows for very strong electrostatic adhesion of a display using only a thin layer of polymeric film. For example, the system may be "built in" to wall paper by applying a thin film (e.g. 1/500" to 1/5000" polyethylene or polyester film) to standard wallpaper (or having such film materials integrated into the paper during manufacture). The wail paper is then placed on walls by conventional means (wheat paste, etc.). An ordinary paper poster is placed against wallpaper and charged over its face with the electric charger.

In yet another embodiment of the invention, paint carrying a sufficient quantity of polyethylene, polypropylene or polyester resin could be painted onto wall surfaces. We have successfully placed an ordinary untreated paper poster on a surface painted with polyester containing paint, the poster surface then being charged over its face with the electric charger. Excellent adhesion was obtained.

In another embodiment the "object" can be printed directly on to the dielectric material and the combination then charged to adhere to a wall surface. Thus, for example, a banner could be printed and easily adhered, i.e. the "object" is the printed matter of such a banner.

Polymeric materials which are known for their good charge retention and low conductivity are useful in the present invention. These include organic polymers such as polytetraflourethylene, its copolymer fluoroethylenepropylene, polycarbonate, polyimide, and polyethyleneterephthalate which can also assume a considerable dipole polarization. Inorganic materials such as silicon dioxide and aluminum oxide may also be used.

Thus, the method of the present invention is not limited to any particular polymeric or non-polymeric material, since the method will work satisfactorily with any material which will retain an adequate electrostatic charge imparted via the hand-held corona charger of the invention. Since the latest foam technologies make it possible to fix any cell size within polymeric foams, specially formulated foams can be used in the invention. Via the use of comonomers, there is now a greatly simplified overall process for creating a broad range of controlled densities. Properties such as bubble wall thicknesses and densities can now be fixed by catalyst composition.

As reported above for foams, although thicker materials (over 1/50" for 6 pound/ft$^3$ and 1/32" for 2 pound/ft$^3$) of equivalent bulk densities had more bubble surface, the increased distance between their two outer surface plates apparently caused proportionately decreased capacitance, canceling out any gain. Greater charge leakage also occurs through the thicker edge. Thus, it is preferred to use small material diameters, i.e., foams with smaller bubble diameters.

Compared to the prior patent of one of the inventors herein, U.S. Pat. No. 4,992,121, materials of 6 lbs. per cubic ft. bulk density used in the present invention have bubble wall thicknesses and overall bubble sizes many times smaller while material densities and charge density potential have increased about five times. These high charge densities are necessary for another important reason not addressed by existing electrostatic support systems and that is the very real problem of the tendency of many materials to curl away from the wall in direct sunlight as well as due to atmospheric conditions. Higher charge densities also promote proportionately longer term adhesion.

The irradiation cross-linked foams specified in U.S. Pat. No. 4,275,112 invariably show a polarization decay within minutes or days to half their original value. The polyethylene and other foam-paper combinations as specified herein also have polarization decay, but since the initial polarization densities are at least twice those of the 2 lbs. per cubic ft. cross-linked materials specified in U.S. Pat. No. 4,275, 112, this becomes a minor detriment, particularly so since once stabilized the subsequent polarization decay is so minimal that the display will remain up for years and perhaps indefinitely.

The present invention thus constitutes an electrostatic support system with "hassle-free" versatility which can be used in many ways:

A. Art and craft books containing static seasonal decorations, paper dolls, cartoon characters, games, animals, and other illustrations that may be cut out with scissors, charged and placed on a wall. Static bulletin boards which hold themselves electrostatically to walls are a possibility.

B. Instant scrap-paper wall designs and Matisse-type decorations may be installed in minutes. Posters, maps, pennants, signs and wallpaper itself are ideal subjects for the static paper use. Easily removed static shrink-wrapped packaging materials as well as painters' static masking materials are possibilities. With this in mind it should be understood that the method of the invention also comprises the steps of positioning an electrostatically chargeable sheet, such as a painter's "drop cloth," on a wall surface and exposing the sheet to a high voltage discharge using the hand-held charger of the invention.

C. Entire walls acquire new dimensions as they are converted to new play areas. They become landscapes for multiple creative efforts.

While only certain materials and methods useful in this invention have been disclosed herein, it is to be understood that many variations of the invention can be made without departing from the true spirit and scope thereof. All such variations are therefore intended to fall within the language of the appended claims. For example, while the disclosed hand-held charger creates a corona type discharge, other hand-held means for imparting a charge to the chargeable materials of the invention are possible. Such might include a hand-held unit capable of electron injection via a non-penetrating electron beam.

What is claimed is:

1. A hand-held charging apparatus for producing a corona charge comprising:

a power source having a first voltage;

a high voltage multiplier connected to the power source for converting the first voltage to a high voltage at a low amperage;

a housing containing the power source and the high voltage multiplier and sized to be held in a human hand; and at least a first electrode mounted on an outer surface of the housing and connected through the housing to said high voltage multiplier;

wherein the apparatus imparts a static electrical charge to an electrostatically chargeable dielectric material for electrostatically adhering the material to a surface without use of an adhesive.

2. A hand-held apparatus as in claim 1, wherein the power source is at least one battery.

3. A hand-held apparatus as in claim 1, wherein said housing further comprises a first longitudinal end and a second longitudinal end, and wherein the first electrode is mounted at said first longitudinal end of the outer surface of the housing and connected through the housing to a positive terminal of the high voltage multiplier, and further comprising a second electrode mounted at said second longitudinal end of the outer surface of the housing and connected through the housing to a negative terminal of the high voltage multiplier, said first and second electrodes being spaced apart from each other.

4. A hand-held apparatus as in claim 3, further comprising a first electrically conductive felt pad affixed over the first electrode and a second electrically conductive felt pad affixed over the second electrode.

5. A hand-held apparatus as in claim 3, wherein each of the first and second electrodes is a thin piece of adhesively-backed copper measuring approximately 1.5 inches wide by 2.25 inches in length, whereby the first and second electrodes may be quickly and easily mounted to said housing.

6. A hand-held apparatus as defined in claim 1, wherein said solid state high voltage multiplier is configured to deliver less than approximately 5 micro-amperes of current at a voltage of approximately 18 kV in a pulse train of approximately 25 kHz.

7. A hand-held apparatus for imparting an electrostatic charge to a dielectric film, comprising:

a housing suitable for hand holding, said housing having a first end and a second end;

at least one battery contained within the housing;

a high voltage multiplier mounted within the housing, said high voltage multiplier connected to the battery and configured to deliver a high frequency of high voltage, low amperage pulses;

a switch mounted in the housing so as to be operable from outside the housing and connected in series between the battery and the high voltage multiplier;

a first electrode mounted at said first end of an outer surface of the housing and connected through the housing to a positive terminal of the high voltage multiplier; and a second electrode mounted at said second end of the outer surface of the housing and connected through the housing to a negative terminal of the high voltage multiplier;

wherein said electrodes impart a static electrical charge to an electrostatically chargeable dielectric material for electrostatically adhering the material to a surface without use of an adhesive.

8. A hand-held apparatus as defined in claim 6, wherein said solid state high voltage multiplier is configured to deliver less than approximately 5 micro-amperes of current at a voltage of approximately 18 kV in a pulse train of approximately 25 kHz.

9. A hand-held apparatus as defined in claim 6, wherein said first and said second electrodes comprise adhesive-backed copper tape.

10. A system for electrostatically adhering a display to a wall surface using static electricity comprising:

at least one sheet of electrostatically-chargeable dielectric film; and a hand-held apparatus for imparting an electrostatic charge to said dielectric material comprising:

a power source having a first voltage;

a high voltage multiplier connected to the power source for converting the first voltage to a high voltage at a low amperage;

a housing containing the power source and the high voltage multiplier, said power source comprising at least one battery; and a first and a second electrode mounted on an outer surface of the housing, each connected through said housing to said high voltage multiplier, said first and second electrodes being located on said housing at a spaced distance from one another;

wherein said at least one sheet of electrostatically-chargeable film is mounted onto a display, and wherein said charging apparatus is passed over the sheet and display to impart an electrostatic charge to said sheet for mounting said sheet and the display together on a wall surface without the use of an adhesive.

11. A system for electrostatically adhering displays to wall surfaces as defined in claim 10, wherein said sheet material is a polymeric film selected from the group constituting polyethylene, polyester, polypropylene, polyteterafluorethylene, fluoroethylenepropylene and polyethyleneterephthalate.

12. A system for electrostatically adhering displays to wall surfaces as defined in claim 11, wherein said film has a thickness of between approximately 0.5 mil to approximately 3.0 mil.

13. A system for electrostatically adhering displays to wall surfaces as defined in claim 10, wherein said pads include carbon fibers.

14. A system for electrostatically adhering a display to a wall surface using static electricity comprising:
- at least one layer of an electrostatically-chargeable dielectric material having a first surface that is in contact with the display and a second surface that is in contact with the wall; and
- a charging apparatus for imparting an electrostatic charge to said dielectric material comprising:
  - power source having a first voltage;
  - a high voltage multiplier connected to the power source, said high voltage multiplier increasing said first voltage to a high voltage at a low amperage;
  - a housing containing the power source and the high voltage multiplier; and
  - at least a first electrode mounted on an outer surface of the housing and connected through the housing to said high voltage multiplier;
  - wherein said charging apparatus imparts an electrostatic charge to said layer of electrostatically-chargeable dielectric material in sufficient strength to mount the display on the wall surface without the use of an adhesive between said dielectric material and the wall surface.

15. A system for electrostatically adhering a display to a wall surface as defined in claim 14, wherein said layer of electrostatically-chargeable dielectric material is a polymeric film.

16. A system for electrostatically adhering a display to a wall surface as defined in claim 14, wherein said layer of electrostatically-chargeable dielectric material is an electrically-chargeable paint.

17. A system for electrostatically adhering a sheet to a wall surface using static electricity comprising:
- a sheet of electrostatically-chargeable dielectric material; and
- an apparatus for imparting an electrostatic charge to said dielectric material comprising:
  - power source having a first voltage and a first amperage;
  - a high voltage multiplier connected to the power source, said high voltage multiplier increasing said first voltage to a high voltage of at least several thousand volts and reducing said first amperage to less than approximately 100 micro amperes;
  - a housing containing the power source and the high voltage multiplier; and
  - a first and a second electrode mounted on an outer surface of the housing, each connected through said housing to said high voltage multiplier, said first and second electrodes being located on said housing at a spaced distance from one another;
  - wherein said charging apparatus imparts an electrostatic charge to said sheet for electrostatically mounting said sheet onto a wall surface without use of an adhesive between said sheet and the wall surface.

18. A system as in claim 17, wherein said first and said second electrodes are each covered with respective soft, flexible electrically-conductive, shock-inhibiting pads.

19. A system as in claim 17, wherein said power source comprises at least one battery, and wherein one of said electrodes is positive and one of said electrodes is negative.

20. A system as in claim 17, wherein said sheet of electrostatically-chargeable dielectric material is a composite of polymer film and paper.

21. A system as in claim 20, wherein said composite comprises two layers of polymer film and a layer of paper in between the two layers of polymer film.

22. A method for electrostatically adhering a display, to a wall surface using static electricity comprising the steps of:
- (a) providing a system for electrostatic adhesion comprising a sheet of electrostatically-chargeable dielectric material, and an apparatus for imparting an electrostatic charge to said sheet of dielectric material, said apparatus comprising:
  - a power source having a first voltage and a first amperage;
  - a high voltage multiplier connected to the power source, said high voltage multiplier increasing said first voltage to a high voltage of at least ten thousand volts and reducing said first amperage to no more than approximately 100 micro amperes;
  - a housing containing the power source and the high voltage multiplier; and
  - a first and a second electrode mounted on an outer surface of the housing, each connected through said housing to said high voltage multiplier, said first and second electrodes being located on said housing at a spaced distance from one another; and
  - said first and second electrodes being covered with respective soft electrically-conductive, shock-inhibiting pads;
- (b) mounting said electrostatically-chargeable sheet onto a display;
- (c) placing the sheet and display against a wall; and
- (d) passing the apparatus over the surface of the sheet and display thereby imparting an electrostatic charge with said apparatus to said sheet, thereby mounting said sheet and the display together on a wall surface without the use of an adhesive.

23. A method for electrostatically adhering an object to a wall surface comprising the steps of:
- (a) positioning an object having at least one substantially flat surface adjacent an electrostatically chargeable dielectric material;
- (b) positioning the object and material adjacent the wall surface; and
- (c) electrostatically charging the object and dielectric material using a hand-held apparatus containing a power source, a high voltage multiplier, and at least one electrode, wherein the high voltage multiplier provides a high voltage, low amperage charge to the electrode sufficient to provide a high density electron discharge.

* * * * *

UNITED STATES PATENT AND TRADEMARK OFFICE
CERTIFICATE OF CORRECTION

PATENT NO. : 5,638,249
DATED : June 10, 1997
INVENTOR(S): Peter M. Rubino
Robert M. Rubino It is certified that error appears in the above - identified patent and that said Letters Patent is hereby corrected as shown below:

Column 10, line 29:

"claim 6" should be "claim 7"

Column 10, line 34:

"claim 6" should be "claim 7"

Signed and Sealed this

Second Day of December, 1997

*Attest:*

BRUCE LEHMAN

*Attesting Officer*     *Commissioner of Patents and Trademarks*